United States Patent [19]
Heiligman

[11] Patent Number: 5,411,661
[45] Date of Patent: May 2, 1995

[54] WATER FILTER MODULE

[75] Inventor: Randy B. Heiligman, Minnetonka, Minn.

[73] Assignee: UltraPure Systems, Inc., Plymouth, Minn.

[21] Appl. No.: 107,643

[22] Filed: Aug. 18, 1993

Related U.S. Application Data

[63] Continuation-in-part of Ser. No. 67,120, May 26, 1993, Pat. No. 5,318,703.

[51] Int. Cl.$^6$ .............................................. B01D 27/08
[52] U.S. Cl. ....................... 210/264; 210/266; 210/282; 210/474; 210/489
[58] Field of Search ............... 210/263, 264, 266, 282, 210/473, 474, 477, 482, 488, 489, 495, 497.01, 499, 497.3, 484

[56] References Cited

U.S. PATENT DOCUMENTS

| | | | |
|---|---|---|---|
| 3,304,852 | 2/1967 | Lande | 99/319 |
| 3,420,675 | 1/1969 | Costas | 99/77.1 |
| 3,971,305 | 7/1976 | Daswick | 99/295 |
| 4,080,299 | 3/1978 | Bartolome | 210/479 |
| 4,528,095 | 7/1985 | Byrne | 210/206 |
| 4,749,481 | 6/1988 | Wheatley | 210/484 |
| 4,764,274 | 8/1988 | Miller | 210/266 |
| 4,826,594 | 5/1989 | Sedman | 210/282 |
| 4,826,695 | 5/1989 | Tanner | 426/77 |
| 4,859,348 | 8/1989 | Jusaitis et al. | 210/799 |
| 4,867,875 | 9/1989 | Peranio | 210/186 |
| 4,867,880 | 9/1989 | Pelle et al. | 210/474 |
| 4,963,262 | 10/1990 | Johnstone | 210/474 |
| 4,995,975 | 2/1991 | Jacquot et al. | 210/266 |
| 4,999,109 | 3/1991 | Sabre | 210/282 |
| 5,076,912 | 12/1991 | Belz et al. | 210/264 |
| 5,215,660 | 6/1993 | Mosher et al. | 210/484 |

Primary Examiner—Robert A. Dawson
Assistant Examiner—W. L. Walker
Attorney, Agent, or Firm—Kinney & Lange

[57] ABSTRACT

Water filter module for filtration of water used to brew coffee, having a series of vertically aligned filters placed in a body member and having a charcoal filtration member bounded by screen at its upper and lower ends and in the water filter module. An alternate embodiment includes a water permeable containment device having encapsulated filtering medium.

19 Claims, 4 Drawing Sheets

WATER FILTER MODULE

CROSS REFERENCES TO CO-PENDING APPLICATIONS

This patent application is a continuation in part patent application of a "Water Filter Module," Ser. No. 08/067,120, filed on May 26, 1993, by the same inventor, which is now U.S. Pat. No. 5,318,703.

BACKGROUND OF THE INVENTION

1. Field of the Invention

The present invention pertains to a filter system, and more particularly, pertains to a water filtration system for filtering of water used in the brewing of coffee through a series of filtration devices, one of which is a layer of carbon granules or other suitable and appropriate filtering material.

2. Description of the Prior Art

Traditional coffee making systems have incorporated elaborate systems for the brewing of coffee and to extract the most desirable brew of coffee, only to have these efforts thwarted by using tap water, the likes of which imparts the taste of impurities contained in the brewing water to the brewed coffee, such to the dislike of the consumer. Most municipalities use chlorine to treat and disinfect their water supply. Chlorine reacts adversely with the water leaving it with a chlorine taste and odor. As a chemical the free chlorine reacts with the coffee grinds to adversely affect the taste of brewed coffee.

The present invention provides a filtration system containing carbon or other suitable media in a container, housing or module for removing undesirable impurities found in the water used to brew coffee. The filter module removes residual chlorine, odors, foul tastes, impurities and any other sediments found in a water supply prior to the water coming in contact with the coffee grinds. The present invention is used with drip type coffee makers. The filter module container or housing is first placed on top of the coffee grinds. Hot water drips into the water filter module, which sits upon the coffee grinds in the coffee grind basket. Water is filtered through the granules of carbon and mesh screens and then exits from the bottom of the invention prior to entering into the coffee grinds. The filter module can also be used for filtration of water for use in tea or other consumable liquids.

SUMMARY OF THE INVENTION

The general purpose of the present invention pertains to a water filtration module, container, housing or the like used to filter coffee brewing water having a body which supports a flared inlet port which channels plain brewing water through a coarse filter and then through a series of finer filters finally to exit through a bottom member onto ground coffee in the upper regions of a coffee brewing device. The water filtration module can be placed above the coffee grinds and prior to the point where the water contacts the coffee grinds in existing drip coffee brewing devices.

According to one embodiment of the present invention, there is provided a body member having a cylindrical or other shape of body and contained chamber into which an upper filtration screen, a layer of carbon or other suitable filtration granules, a lower filtration screen and a bottom member to fit, align and secure to the body member. An integral flared member extends above the cylindrical body and a holed planar member common to both the cylindrical body and the extending flared member.

According to another embodiment of the present invention, there is provided a filter having suitable filtration granules contained in a porous covering whereby brewing water enters the top portion, is subsequently filtered by the filtration granules and then exits the lower portion.

One significant aspect and feature of the present invention is a water filter module containing or housing having a flared or other shaped member for receiving of unfiltered water. Another significant aspect and feature of the present invention is a water filtration module containing or housing having a multiple filtration system.

Another significant aspect and feature of the present invention is a water filtration module having a carbon granule filter.

Another significant aspect and feature of the present invention is a water filtration module, containing or housing featuring a containment device for loosely packed carbon granules, KDF resin, magnesium permeate or other suitable filtration, treatment, purification media.

Another significant aspect and feature of the present invention is a water filtration model, container or housing which is placed on top of the coffee grinds so that filtration, treatment or purification of the brewing water is affected prior to contact with the coffee grinds.

Another significant aspect and feature of the present invention is a module, container or housing made of any suitable material such as plastic, paper, cardboard, metal, mesh or other suitable material whereby filtration, treatment or purification of brewing water may be accomplished.

Having thus described embodiments of the present invention, it is the principal object hereof to provide a water filter module or granule containment device for a coffee brewer for complete filtration of water used to brew coffee.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
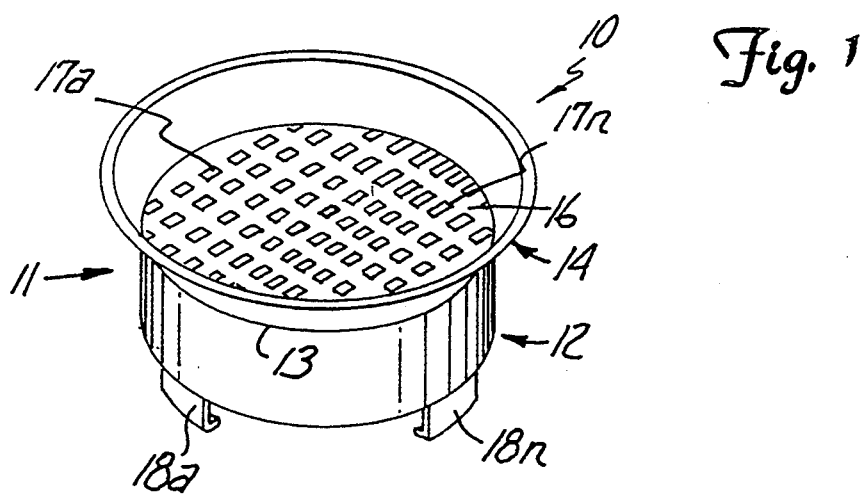
FIG. 1 illustrates a perspective view of the water filter module, the present invention.
Figure 2:
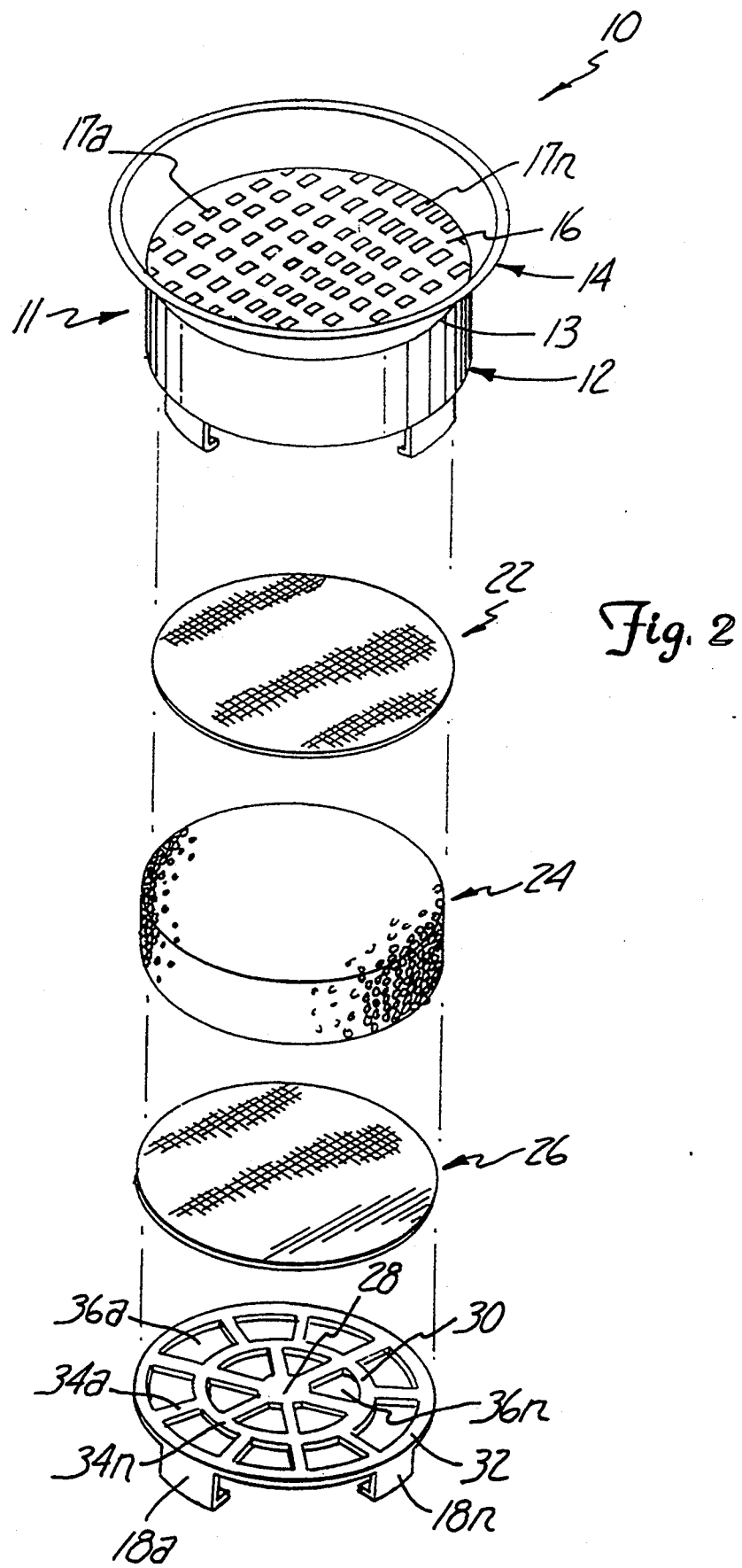
FIG. 2 illustrates an exploded view of the water filter module.

FIG. 1 illustrates a water filter module 10 for filtering of impurities from water used in a coffee brewing device. The water filter module 10 includes filtering devices aligned about the interior of the externally visible members as illustrated in the figures that follow. The water filter module 10 includes a polymer body 11 having a cylindrical shaped member 12, an edge 13, a flared annular lip 14 extending from the upper region of the cylindrical shaped member 12, an integral planar member 16 having a plurality of small holes 17a–17n aligned at the inner intersection of the cylindrical shaped member 12 and the flared annular lip 14, and a plurality of support feet 18a–18n extending from a polymer bottom member 20 as illustrated in FIG. 2. Although the aforementioned components are constructed of polymer, they can also be constructed of metal, paper, cardboard, mesh material or other suitable materials.

FIG. 2 illustrates an exploded view of the water filter module 10 including the main polymer body member 11, an upper mesh screen 22, carbon granules 24, a lower screen 26 and a polymer bottom member 20 having a plurality of support feet 18a–18n extending downwardly therefrom. The upper mesh screen 22 and the lower mesh screen 26, in conjunction with the cylindrical shaped member 12, encapsulates the carbon granules 24 within the confines of the polymer body 11. The carbon granules can be of an appropriate size in a range of 20×100 mesh size, such as sold by Westvaco. Other materials may be used for filtration such as KDF resin which is used for removal of chlorine, or magnesium permeate for removal of hardness. Each material can be used individually depending on filtration requirements or bay be mixed or blended with other appropriate substances to provide for multiple substance treatment of the brewing water. The polymer bottom member 20 being essentially planar includes a round center member 28, ring members 30 and 32 concentric to the round center 28, a plurality of spoke members 34a–34n connecting the center member 28 to ring members 30 and 32, and a plurality of voids 36a–36n between the intersecting center member 28, ring members 30 and 32 and spoke members 34a–34n. The bottom number 20 can also be constructed of any suitable material such as plastic, metal, cardboard, paper or the like. The screens 22 and 26 can be a suitable polymer mesh material of a fine mesh size to filter out small particles or impurities. The upper mesh screen 22, lower mesh screen 26 can also be perforated, slotted and of other suitable plastic or other material configured to allow flow of fluid there through.

Figure 3:
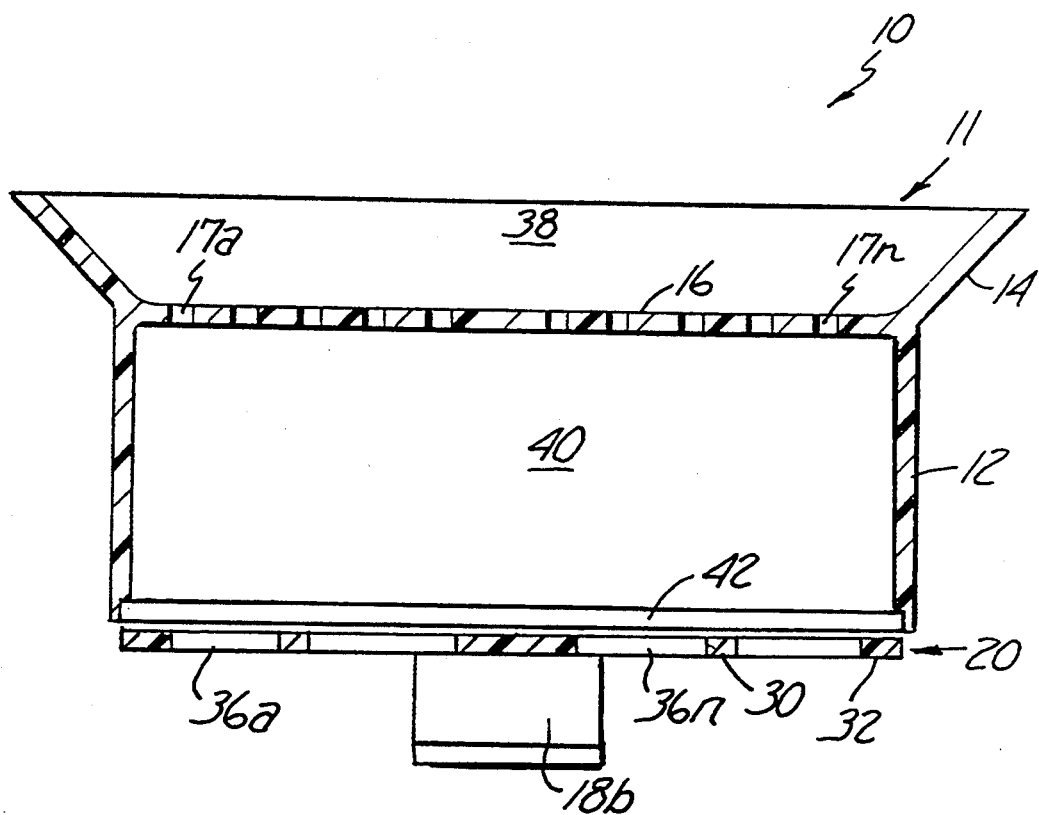
FIG. 3 illustrates a cross-sectional view of the body and bottom of the water filter module; and, FIG. 4 illustrates a cross-sectional view of an assembled water filter module.

FIG. 3 illustrates a cross section of the polymer body 11 where all numerals correspond to those elements previously described. A receiving chamber or port 38 is formed by the planar member 16 and the intersecting flared annular lip 14 to receive water for filtration as described later in detail. A chamber 40 is formed by the under surface of the planar member 16, the cylindrical body 12 and the polymer bottom member 20. The chamber 40 accommodates the upper and lower screens 22 and 26 and the carbon granules 24 described in FIG. 2. An annular groove 42 about the lower edge of the cylindrical ember 12 of the polymer body 11 accommodates a portion on the outer ring 32 of the polymer bottom member 20 and is suitably secured therein, such as by ultrasonic welding, adhesives or any other suitable securing process. In an alternative embodiment, the bottom member can be molded integral to the body, and the top planar mesh member can be dropped in and secured to the body once the screens and the carbon block are inserted.

Figure 4:
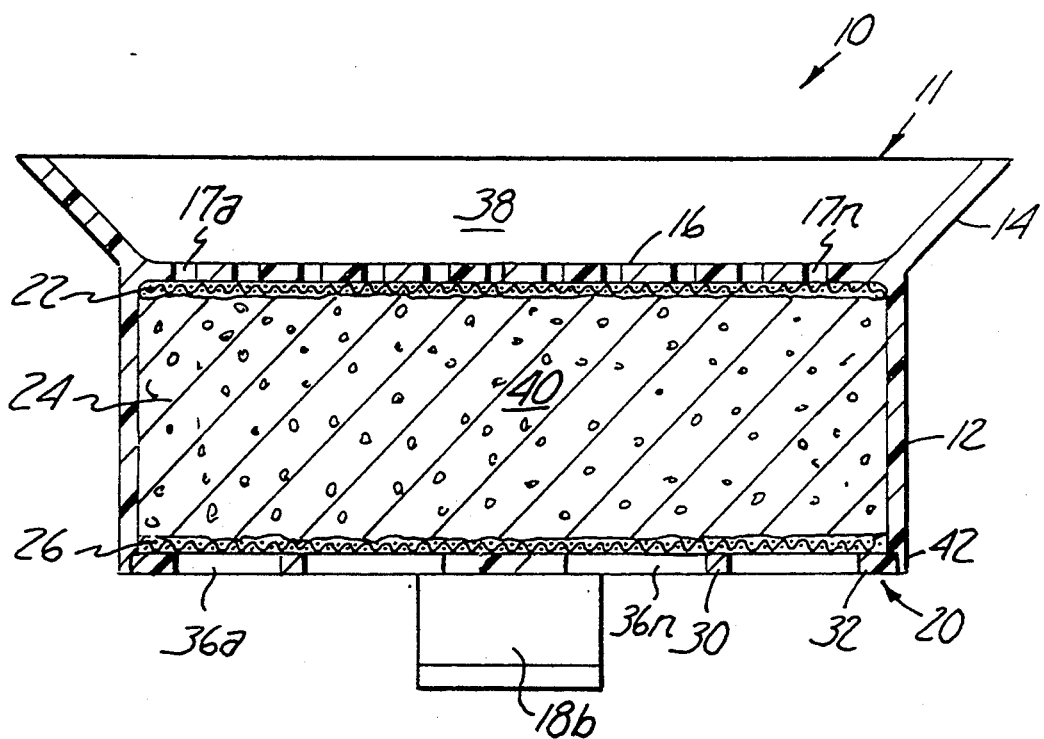

FIG. 4 illustrates the assembled water filter module 10 where all numerals correspond to those elements previously described. The water filter module 10 is assembled by affixing the upper screen member 22 within the chamber 40 and to the underside of the hole planar member 16, such as by ultrasonic welding or other suitable means. The carbon granules 40 are then placed in the chamber 40 against the upper screen 22. Finally, the polymer bottom member 20, having the lower screen 26 suitably attaches to the upper surface of the polymer bottom member 20, such as by ultrasonic welding, is brought into the chamber 40 to bear against the carbon granules 24 and, at the same time, aligned with the annular groove 42 in the lower inner edge of the cylindrical body 12 and suitably secure thereto as previously described. The upper and lower screens 22 and 26, as well as providing filtration also serve the function of containing the carbon granules within the chamber 40.

MODE OF OPERATION

FIG. 4 best illustrates the mode of operation of the water filter module 10. The water fixture module 10 is placed with its support feet on top of a mound of ground coffee beans or ground coffee awaiting the brewing process. Water is then introduced into the receiving chamber or port 38 from suitable source and is introduced by the plurality of holes 17a–17n in the planar member 16, into the upper screen 22, which filters out any other large impurities or other undesirable material. If desired, polymer filter media common to this art can also be inserted into the receiving chamber 38 and sonically welded to provide mechanical filtration to remove sediment and other dirt particles. After this coarse filtering through the upper screen 22, the water is filtered through the carbon granules 24 and the lower screen 26. After this thorough filtration through the chamber 40, the filtered water passes through the voids 36a–36n in the polymer bottom member 20 and onto a mound of ground coffee awaiting the brewing process in the upper region of a coffee brewing device. Other filtration mediums can also be used to filter, treat or purify the coffee brew water to remove unwanted tastes, odors, dirt, sediment, scale, lime or hardness from coffee brewing water. Other filtration can be such as, but not limited to, KDF resin for removal of chlorine or magnesium permeate for removal of hardness.

Figure 5:
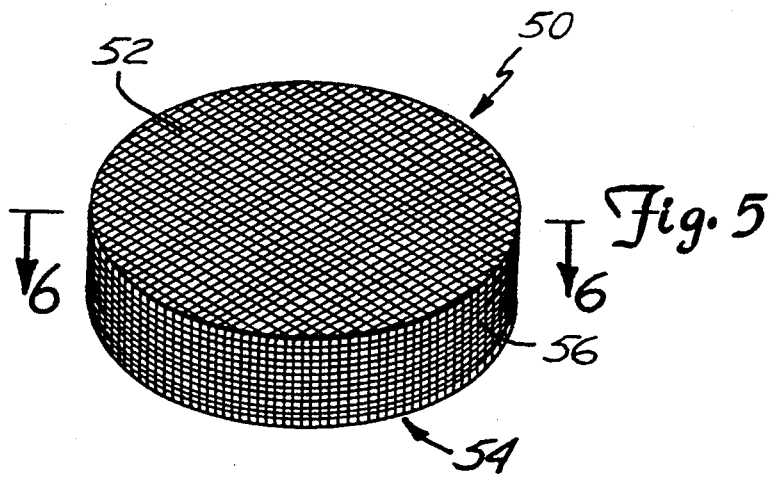
FIG. 5 an alternate embodiment, illustrates a perspective view of a water permeable filter.

FIG. 5, a first alternative embodiment illustrates a perspective view of a water permeable filter 50 for encapsulation of filter medium such as activated charcoal, KDF resin, magnesium permeate or other suitable filtration medium. The filter 50 is placed upon the coffee grinds in a coffee or tea brewing device to filter incoming brewing water prior to its contact with the coffee grinds positioned below it. The filter 50 includes a top surface 52, a bottom surface 54, illustrated also in FIG. 6. and a cylindrical side surface 56 aligned between the top surface 52 and the bottom surface 56. Surfaces 52, 54 and 56 are of wire plastic or other mesh composition which allow the flow of brewing water to pass through from the top surface 52 through contained filtration material, and through to the bottom surface 54 or even the cylindrical side surface 56. Although the surfaces 52, 54 and 56 are described as mesh, any suitable permeable surfaces may be used which allow passage of brewing water and may include small holes, slots or the like. The surfaces can also be of porous material which allows the passage of water. The surfaces 52–56 can also be constructed of any suitable material such as plastic, metal, cardboard, paper, fibrous material or the like which include holes or the like for passage of brewing water the top surface 52, the bottom surface 54 and the cylindrical surface 56 from the water permeable containment device 57. The surface can form a bag or housing. Filtration materials such as activated charcoal, KDF resin, magnesium permeate or any other desired filter, treatment or cleaning material are contained by the water permeable filter surfaces 52, 54 and 56 as illustrated in FIG. 6.

Figure 6:
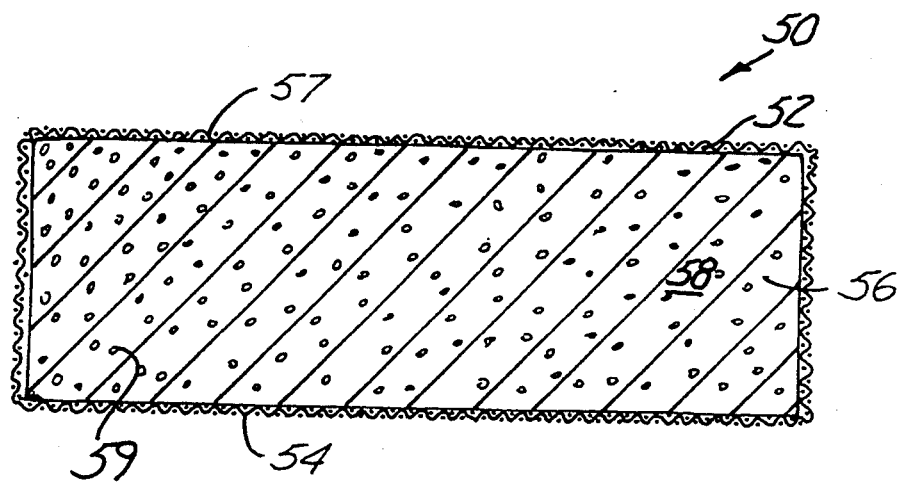
FIG. 6 illustrates a cross section along line 6—6 of FIG. 5.

FIG. 6 illustrates a cross section view along line 6—6 of FIG. 5 where all numerals correspond to those elements previously described. The interior cavity 58 is filled with a suitable filtering medium 59 such as, but not limited to, particles of activated granular carbon, KDF fluid treatment or other suitable filtration material. The water permeable surfaces 52, 54 and 56 contain the filtering medium 59 for filtration of coffee brewing water.

Figure 7:
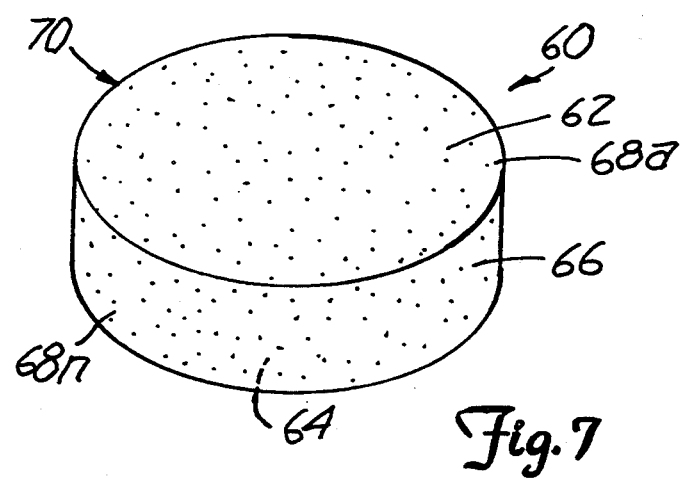
FIG. 7, an alternate embodiment, illustrates a perspective view of a water permeable filter.

FIG. 7, a second alternative embodiment illustrates a perspective view of a water permeable filter 60 having a top surface 62, a bottom surface 64 and a cylindrical side surface 66 between surface 62 and 64 where each surface has a plurality of holes 68a–68n. The surfaces can be of any suitable material such as plastic, metal, cardboard or paper. As previously described, Figures a suitable granular filter medium is contained by the top surface 62, the bottom surface 64 and cylindrical side surface 66 which form the water permeable containment device 70.

Various modifications can be made to the present invention without departing from the apparent scope hereof.

I claim:

1. A water filter for a drip coffee brewer comprising:
a water permeable housing formed by a first horizontal porous media surface forming an inlet for receiving unfiltered water, a second horizontal porous media surface opposite the first porous media surface forming an outlet for dispensing filtered water, and a side porous media surface between the first and second surfaces wherein the side porous media surface also acts as an outlet for dispensing filtered water, the first, second and side porous media surfaces being constructed together to form a fully enclosed chamber; and
a carbon-based water filtration media entirely contained within the chamber between the first, second and side porous media surfaces for filtering the water.

2. The water filter of claim 1, wherein the side porous media surface of the housing is cylindrical.

3. The water filter of claim 2, wherein the porous media surfaces are constructed of cotton.

4. The water filter of claim 2, wherein the porous media surfaces are constructed of a woven polymer.

5. The water filter of claim 2, wherein each of the porous media surfaces is selected from the group consisting of paper, cardboard and felt.

6. A water filter for a drip coffee brewer comprising:
a water permeable housing having an inlet, an outlet, a first planar horizontal mesh member across the inlet, and a flared annular lip extending upwardly and outwardly from the inlet to define a funnel for receiving and preventing overflow of the water before the water passes into the housing inlet;
a water filtering medium within the housing, wherein the filtering medium is contained between the first and second mesh screens.

7. The water filter of claim 6, wherein the first mesh screen is a polymer mesh screen.

8. The water filter of claim 7, wherein the second mesh screen is a polymer mesh screen.

9. The water filter of claim 6, further comprising a bottom member positioned adjacent the second mesh screen and including a plurality of spoke members for supporting the second mesh screen wherein each of the plurality of spoke members extends outward from a center hub to the housing.

10. The water filter of claim 6, wherein the filtering media includes loose carbon granules.

11. The water filter of claim 10, wherein the carbon granules have a 20×200 mesh size.

12. The water filter of claim 6, wherein the filtering media is KDF resin.

13. The water filter of claim 6, wherein the filtering media is magnesium permeate.

14. A water filter for filtering water used in a drip coffee brewer, the drip coffee maker having a bed of ground coffee beans and a hot water source, the water filter comprising:
a water permeable housing having an inlet surface which faces the hot water source when the water filter is positioned in the drip coffee brewer, and an outlet surface which faces the ground coffee beans when the water filter is placed in the drip coffee brewer;
a first mesh screen positioned within the housing and forming the inlet surface;
a second mesh screen positioned within the housing and forming the outlet surface;
a filtration medium contained within the housing between the first and second mesh screens; and
support means extending from the housing in a direction of the water flow through the outlet surface such that the support means engage the ground coffee beans and support the outlet surface sufficiently above the ground coffee beans to prevent the filtered hot water from backing up into the housing.

15. The water filter of claim 14, wherein the housing includes a flared annular lip extending upwardly and outwardly from the inlet to define a funnel for receiving and preventing water overflow before the water passes into the housing inlet.

16. The water filter of claim 14, wherein the first and second mesh screens are polymer mesh screens.

17. The water filter of claim 14, further comprising a bottom member positioned adjacent the second mesh screen and including a plurality of spoke members for supporting the second mesh screen wherein each of the plurality of spoke members extends outward from a center hub to the housing.

18. The water filter of claim 14, wherein the filtration media includes loose carbon granules having a 20×200 mesh size.

19. The water filter of claim 14, wherein the support means include a plurality of feet.

* * * * *